United States Patent
Sugaya et al.

(10) Patent No.: US 10,439,949 B2
(45) Date of Patent: Oct. 8, 2019

(54) TRANSMISSION CONTROL DEVICE, TRANSMISSION CONTROL METHOD, RECEPTION CONTROL DEVICE, AND RECEPTION CONTROL METHOD

(71) Applicant: SONY CORPORATION, Tokyo (JP)

(72) Inventors: Shigeru Sugaya, Kanagawa (JP); Eisuke Sakai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/558,739

(22) PCT Filed: Feb. 24, 2016

(86) PCT No.: PCT/JP2016/055463
§ 371 (c)(1),
(2) Date: Sep. 15, 2017

(87) PCT Pub. No.: WO2016/181685
PCT Pub. Date: Nov. 17, 2016

(65) Prior Publication Data
US 2018/0083883 A1 Mar. 22, 2018

(30) Foreign Application Priority Data
May 8, 2015 (JP) .................. 2015-095831

(51) Int. Cl.
*H04L 12/801* (2013.01)
*H04L 29/08* (2006.01)
(Continued)

(52) U.S. Cl.
CPC ............ *H04L 47/34* (2013.01); *G06F 3/0604* (2013.01); *G06F 3/0652* (2013.01);
(Continued)

(58) Field of Classification Search
CPC ....... H04L 47/34; H04L 29/08; G06F 3/0604; G06F 3/0652; G06F 3/0673; H04W 28/04; H04W 84/12
See application file for complete search history.

(56) References Cited

U.S. PATENT DOCUMENTS

| 6,526,022 | B1 | 2/2003 | Chiu et al. |
| 2004/0064578 | A1* | 4/2004 | Boucher ................. H04L 29/06 709/236 |

(Continued)

FOREIGN PATENT DOCUMENTS

| JP | 2007-228408 A | 9/2007 |
| JP | 2011-125035 A | 6/2011 |

(Continued)

OTHER PUBLICATIONS

International Search Report dated May 17, 2016 in PCT/JP2016/055463 filed Feb. 24, 2016.

(Continued)

*Primary Examiner* — Ajay Cattungal
(74) *Attorney, Agent, or Firm* — Xsensus, LLP

(57) ABSTRACT

[Object] To provide a technology capable of performing processing on desired data in the reception-side communication device, even in the case in which a sequence number space is shared among a plurality of pieces of data transmitted from the transmission-side communication device.
[Solution] Provided is a transmission control device including: a communication control unit that controls transmission of a plurality of pieces of data including respective sequence numbers; and a data generation unit that generates, as information indicating one or a plurality of pieces of data to be processed in a reception device among the plurality of pieces of data, number information indicating the sequence numbers included in the one or plurality of pieces of data to (Continued)

be processed. The communication control unit controls transmission of the number information to the reception device.

13 Claims, 18 Drawing Sheets

(51) Int. Cl.
*H04W 28/04* (2009.01)
*H04W 84/12* (2009.01)
*G06F 3/06* (2006.01)

(52) U.S. Cl.
CPC ............ *G06F 3/0673* (2013.01); *H04L 29/08* (2013.01); *H04W 28/04* (2013.01); *H04W 84/12* (2013.01)

(56) References Cited

U.S. PATENT DOCUMENTS

| | | | | |
|---|---|---|---|---|
| 2004/0064589 | A1* | 4/2004 | Boucher | H04L 69/16 709/250 |
| 2004/0073703 | A1* | 4/2004 | Boucher | H04L 69/16 709/245 |
| 2007/0230493 | A1 | 10/2007 | Subrahmanyam | |
| 2008/0212613 | A1* | 9/2008 | Perkinson | H04L 47/10 370/475 |
| 2013/0077554 | A1* | 3/2013 | Gauvreau | H04L 5/001 370/312 |
| 2015/0023355 | A1 | 1/2015 | Tokumo et al. | |
| 2015/0237180 | A1* | 8/2015 | Swartzentruber | H04L 69/324 370/394 |

FOREIGN PATENT DOCUMENTS

| | | |
|---|---|---|
| WO | 2007/008123 A1 | 1/2007 |
| WO | 2009/021214 A2 | 2/2009 |
| WO | 2010/075892 A1 | 7/2010 |
| WO | 2013/115121 A1 | 8/2013 |

OTHER PUBLICATIONS

Supplemental European Search Report dated Oct. 10, 2018, issued in corresponding European Patent Application No. 16792411.7.
Office Action issued in European Application 16 792 411.7-1215 dated Apr. 4, 2019.

* cited by examiner

| Element Type | Length | Control Parameter | Flow ID | Start Sequence No. | Sequence No. Bitmap |

TRANSMISSION CONTROL DEVICE, TRANSMISSION CONTROL METHOD, RECEPTION CONTROL DEVICE, AND RECEPTION CONTROL METHOD

TECHNICAL FIELD

The present disclosure relates to a transmission control device, a transmission control method, a reception control device, and a reception control method.

BACKGROUND ART

Recently, various technologies related to a wireless local area network (LAN) have become widespread. For example, as a wireless LAN technology, a protocol referred to as a block acknowledgement (hereinafter also referred as "block ACK") for sequentially transmitting a plurality of pieces of data from a transmission-side communication device and then collectively returning reception confirmation from a reception-side communication device is used. For example, a method of performing an acknowledgement associated with the most recently transmitted transmission sequence indicator during block acknowledgement is disclosed (for example, refer to Patent Literature 1).

CITATION LIST

Patent Literature

Patent Literature 1: JP 2011-125035A

DISCLOSURE OF INVENTION

Technical Problem

However, even in the case in which a sequence number space is shared among a plurality of pieces of data transmitted from the transmission-side communication device, it is desired to provide a technology capable of performing processing on desired data in the reception-side communication device.

Solution to Problem

According to the present disclosure, there is provided a transmission control device including: a communication control unit that controls transmission of a plurality of pieces of data including respective sequence numbers; and a data generation unit that generates, as information indicating one or a plurality of pieces of data to be processed in a reception device among the plurality of pieces of data, number information indicating the sequence numbers included in the one or plurality of pieces of data to be processed. The communication control unit controls transmission of the number information to the reception device.

According to the present disclosure, there is provided a transmission control method including: controlling transmission of a plurality of pieces of data including respective sequence numbers; generating, as information indicating one or a plurality of pieces of data to be processed in a reception device among the plurality of pieces of data, number information indicating the sequence numbers included in the one or plurality of pieces of data to be processed; and controlling transmission of the number information to the reception device.

According to the present disclosure, there is provided a reception control device including: a communication control unit that controls reception, from a transmission device, of number information indicating sequence numbers included in one or a plurality of pieces of data to be processed, as information indicating the one or plurality of pieces of data to be processed among a plurality of pieces of data including respective sequence numbers; and a data acquisition unit that acquires the number information.

According to the present disclosure, there is provided a reception control method including: controlling reception, from a transmission device, of number information indicating sequence numbers included in one or a plurality of pieces of data to be processed, as information indicating the one or plurality of pieces of data to be processed among a plurality of pieces of data including respective sequence numbers; and acquiring the number information.

Advantageous Effects of Invention

As described above, according to the present disclosure, even when a sequence number space is shared among a plurality of pieces of data transmitted from a transmission-side communication device, a technology capable of performing processing on desired data in a reception-side communication device is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 10 is a view for describing a sequence of a receiving operation according to the second embodiment of the present disclosure.

FIG. 12 is a view illustrating a configuration example of flush information according to the second embodiment of the present disclosure.

MODE(S) FOR CARRYING OUT THE INVENTION

Figure 1:
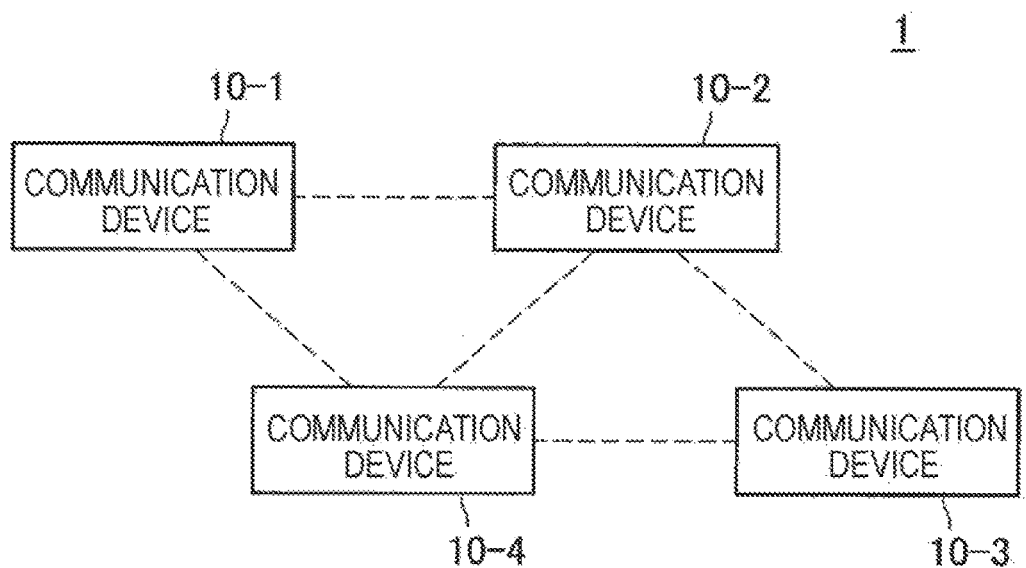
FIG. 1 is a view illustrating a configuration example of a communication system common to each embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets or numerals after the same reference sign. However, when there is no need in particular to distinguish structural elements that have substantially the same function and structure, the same reference sign alone is attached.

The description will be given in the following order.
1. Description of problem
2. Configuration common to each embodiment
3. First Embodiment
4. Second Embodiment
5. Application example
6. Conclusion

1. Description of Problem

Recently, various technologies related to wireless local area network (LAN) have become widespread. For example, as a wireless LAN technology, a protocol referred to as a block ACK for sequentially transmitting a plurality of pieces of data from a transmission-side communication device and then collectively returning reception confirmation from a reception-side communication device is used. In such a protocol, a sequence number of a start data frame requesting acknowledgement is described in a request frame of the block ACK, and the reception-side communication device returns the sequence number of the data frame received from this starting sequence number in a bitmap format.

In this protocol, for example, when unicast communication is performed, a sequence number is managed for each destination communication device, and the sequence number is defined so that one is added each time a data frame and a management frame are transmitted. On the other hand, when multicast communication is performed, an implementation in which a single sequence number space is shared for a plurality of multicast communications without preparing a sequence number space for each of the multicast communications is possible. As an example, a method of performing an acknowledgement associated with the most recently transmitted transmission sequence indicator during a block acknowledgement is disclosed (for example, JP 2011-125035A).

However, if a single sequence number space is shared by a plurality of multicast communications, a sequence number assigned to each multicast frame becomes a toothless value. Therefore, although transfer of a certain multicast frame is originally ended, because another multicast frame exists, a buffer of a reception-side communication device cannot be flushed. As a result, a situation in which, although reception of a frame to be received by itself is completed, an arrival of a frame which does not need to be received by itself is continuously waited for may occur. Here, flush means, for example, a process of opening data in a buffer or delivering the data to an upper layer.

When transmission of a management frame such as a beacon signal is performed while data is being continuously transmitted from a transmission-side communication device, inconsecutiveness may occur in a sequence number when a sequence number for multicast communication is also shared for a management frame. In the method of performing an acknowledgement associated with a transmission sequence indicator as disclosed in the above literature, because a transmission sequence number (TSN) is added for each request for a block acknowledgement, the method cannot be used to flush data in internal sequence number units of a block acknowledgement.

2. Configuration Common to Each Embodiment

In the embodiments of the present disclosure, a method for solving such a problem is mainly proposed. Before describing each embodiment of the present disclosure, a configuration common to each of the embodiments of the present disclosure will be described first. FIG. 1 is a view illustrating a configuration example of a communication system common to each of the embodiments of the present disclosure. As illustrated in FIG. 1, a communication system 1 includes communication devices 10-1 to 10-4 and constitutes a wireless network with the communication devices 10-1 to 10-4. Although the communication system 1 includes four communication devices 10 in the example illustrated in FIG. 1, the number of communication devices 10 included in the communication system 1 is not particularly limited.

The function of each of the communication devices 10-1 to 10-4 is not limited. For example, the communication device 10-4 may function as an access point. In that case, while using the communication device 10-4 as an access point, the communication devices 10-1 to 10-3 can perform wireless communication under the control of the access point (the communication device 10-4). Alternatively, the access point may not be particularly present.

As illustrated in FIG. 1, for example, the communication device 10-1 may communicate with the communication device 10-2 and the communication device 10-4. The communication device 10-2 may communicate with the communication device 10-1, the communication device 10-3, and the communication device 10-4. The communication device 10-3 may communicate with the communication device 10-2 and the communication device 10-4. The communication device 10-4 may communicate with the communication device 10-1, the communication device 10-2, and the communication device 10-3.

Here, as described above, when the communication device 10-4 functions as an access point, first multicast data may be transmitted from the communication device 10-4 to the communication device 10-1 and the communication device 10-2. Also, second multicast data may be transmitted from the communication device 10-4 to the communication device 10-2 and the communication device 10-3. Further, third multicast data may be transmitted from the communication device 10-4 to the communication device 10-1 and the communication device 10-3.

Figure 2:
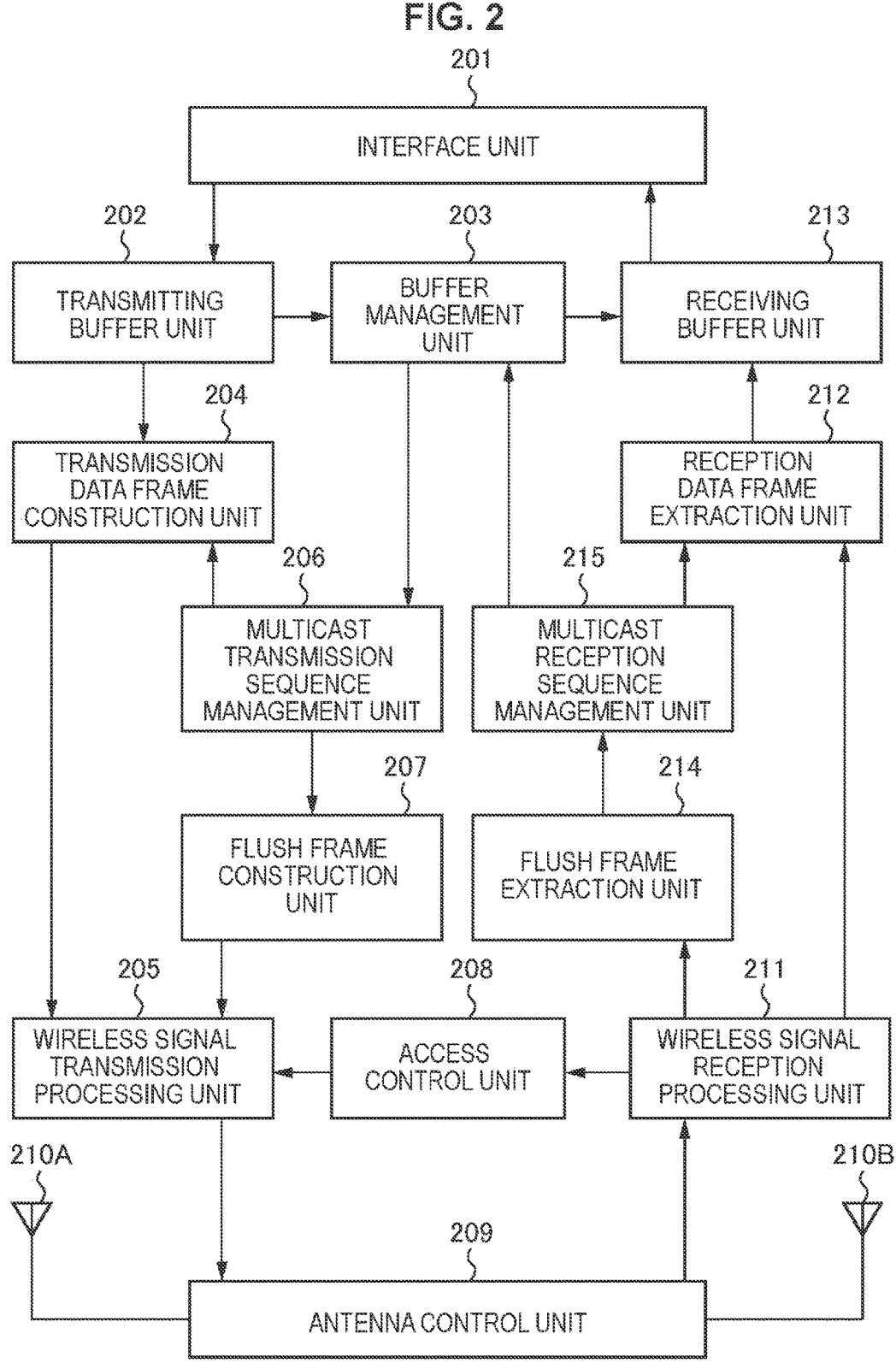
FIG. 2 is a view illustrating a configuration example of a communication device.

Each of the communication devices 10-1 to 10-4 may also function as a transmission-side communication device (or a transmission control device) or may also function as a reception-side communication device (or a reception control device). Next, a configuration example of the communication device 10 will be described. FIG. 2 is a view illustrating a configuration example of the communication device 10. Here, although the communication device 10-4, which serves as an access point, and the other communication devices 10-1 to 10-3 are described as having the same configuration for convenience, the communication device 10-4 may be connected to the Internet via a wired network when, for example, the communication device 10-4 functions as an access point.

As illustrated in FIG. 2, the communication device 10 includes an interface unit 201, a transmitting buffer unit 202, a buffer management unit (storage control unit) 203, a transmission data frame construction unit 204, a wireless signal transmission processing unit (communication control unit) 205, a multicast transmission sequence management unit 206, and a flush frame construction unit (data generation unit) 207. A flush frame will be described below.

Further, the communication device 10 includes an access control unit 208, an antenna control unit 209, and antenna elements 210A and 210B. Further, the communication device 10 includes a wireless signal reception processing unit (communication control unit) 211, a reception data frame extraction unit (data acquisition unit) 212, a receiving buffer unit 213, a flush frame extraction unit 214, and a multicast reception sequence management unit 215.

The interface unit 201 includes an input unit for inputting information from a user or an output unit for outputting information to the user. The transmitting buffer unit 202 stores data to be transmitted to another communication device. The buffer management unit 203 manages a use status of an internal memory space arranged as a buffer. The transmission data frame construction unit 204 constructs transmission data having a predetermined wireless transmission data frame format. The wireless signal transmission processing unit 205 converts a data frame to be transmitted from a baseband signal into a high-frequency signal.

The multicast transmission sequence management unit 206 manages a communication sequence for multicast communication. The flush frame construction unit 207 constructs a flush frame for multicast communication. The access control unit 208 controls access of communication on a wireless transmission path based on a predetermined wireless communication protocol. The antenna control unit 209 transmits a signal on the wireless transmission path and controls an antenna that receives the signal from the wireless transmission path. The antenna elements 210A and 210B transmit or receive the signals as a plurality of antenna elements.

The wireless signal reception processing unit 211 converts a high-frequency signal received via the antenna into a baseband signal. The reception data frame extraction unit 212 extracts data from the baseband signal as a predetermined data frame. The receiving buffer unit 213 temporarily stores received user data until a predetermined unit of data that can be output to the interface unit is collected. The flush frame extraction unit 214 extracts the flush frame according to the present disclosure from the received baseband signal. The multicast reception sequence management unit 215 manages the reception sequence of the multicast communication.

3. First Embodiment

Figure 3:
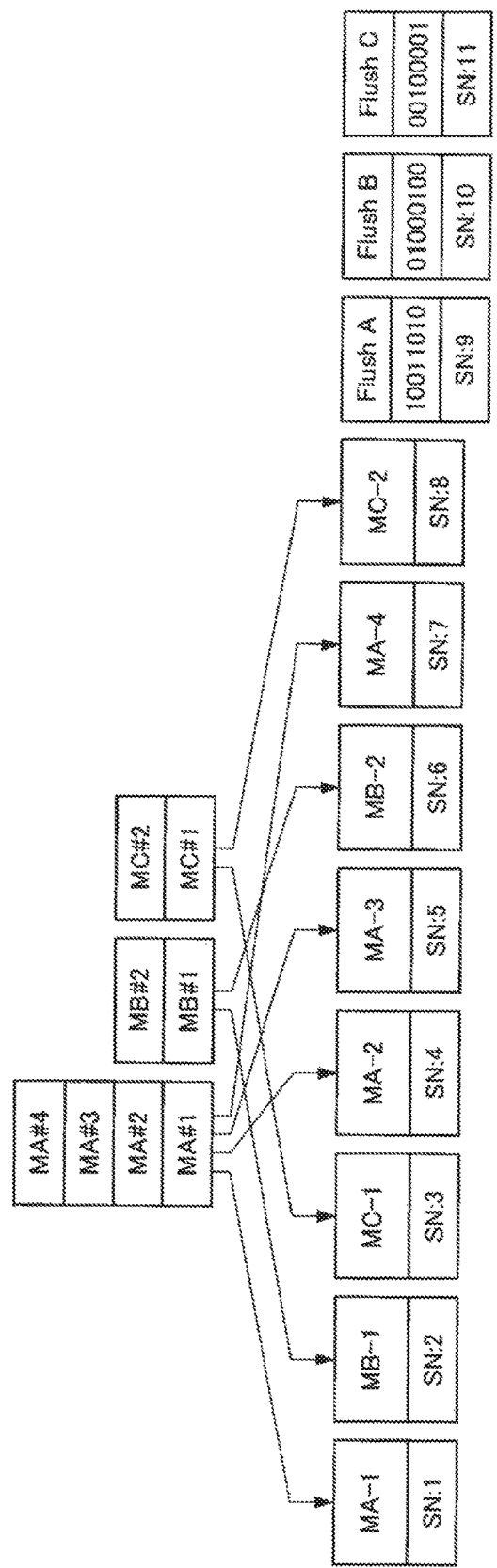
FIG. 3 is a view for describing a sequence of a transmitting operation according to a first embodiment of the present disclosure.

Next, the first embodiment of the present disclosure will be described. FIG. 3 is a view for describing a sequence of a transmitting operation according to the first embodiment of the present disclosure. As illustrated in FIG. 3, in the communication system 1, three flows of multicast communication MA, MB, and MC are performed. Pieces of multicast data MA#1 to MA#4 are stored as the multicast communication MA in the transmitting buffer, Pieces of multicast data MB#1 and MB#2 are stored as the multicast communication MB in the transmitting buffer, and pieces of multicast data MC#1 and MC#2 are stored as the multicast communication MC in the transmitting buffer.

In the transmission-side communication device, the multicast transmission sequence management unit 206 adds a sequence number for multicasting to the above multicast data, and the wireless signal transmission processing unit 205 controls transmission of the multicast data. First, the transmission-side communication device adds a sequence number SN:1 to the multicast data MA#1 and transmits the multicast data MA#1, adds a sequence number SN:2 to the multicast data MB#1 and transmits the multicast data MB#1, and adds a sequence number SN:3 to the multicast data MC#1 and transmits the multicast data MC#1. As described above, although an individual sequence number is added to each piece of multicast data to be transmitted, the sequence number becomes an inconsecutive value for each flow of multicast communication.

Further, the transmission-side communication device adds a sequence number SN:4 to the multicast data MA#2 and transmits the multicast data MA#2, adds a sequence number SN:5 to the multicast data MA#3 and transmits the multicast data MA#3, adds a sequence number SN:6 to the multicast data MB#2 and transmits the multicast data MB#2, adds a sequence number SN:7 to the multicast data MA#4 and transmits the multicast data MA#4, and adds a sequence number SN:8 to the multicast data MC#2 and transmits the multicast data MC#2.

Here, in the transmission-side communication device, for example, an end of the transmission of the multicast data stored in the transmitting buffer is a trigger for the wireless signal transmission processing unit 205 to control transmission of the flush frame according to the present disclosure. The flush frame is information (number information) indicating one or a plurality of pieces of data to be processed in the reception-side communication device among the multicast data and indicates a sequence number included in each of the one or plurality of pieces of data to be processed.

The wireless signal transmission processing unit 205 may control transmission by multicast communication of the flush frame. Further, the flush frame may be defined for each flow of the multicast communication. For example, as illustrated in FIG. 3, in the transmission-side communication device, the flush frame construction unit 207 generates a flush frame: Flash A of the multicast communication MA, a flush frame: Flash B of the multicast communication MB, and a flush frame: Flash C of the multicast communication MC.

When the flush frames are subject to multicast transmission, a predetermined sequence number may not be added to the flush frames, but a predetermined sequence number may be added thereto as a type of management frame and sent.

Specifically, as illustrated in FIG. 3, a sequence number SN:9 is added to Flash A, a sequence number SN:10 is added to Flash B, and a sequence number SN:10 is added to Flash C. Then, the wireless signal transmission processing unit 205 controls transmission of the flush frames.

According to the transmission-side communication device, even when a sequence number space is shared among the plurality of pieces of multicast data transmitted from the transmission-side communication device, predetermined processing on desired data can be performed in the reception-side communication device.

In the example illustrated in FIG. 3, each of a plurality of data frames transmitted from the transmission-side communication device to the reception-side communication device is described independently. However, aggregation processing may be performed on the plurality of data frames as necessary in the transmission-side communication device, and the plurality of data frames may be combined as a single physical layer (PHY) burst and transmitted to the reception-side communication device.

Figure 4:
FIG. 4 is a view for describing a sequence of a receiving operation according to the first embodiment of the present disclosure.

FIG. 4 is a view for describing a sequence of a receiving operation according to the first embodiment of the present disclosure. FIG. 4 illustrates a receiving operation of the reception-side communication device performing the multicast communication MA and illustrates an operation of extracting only multicast data to be processed from multicast data transmitted, with inconsecutive sequence numbers attached thereto, from the transmission-side communication device and reconstructing the data. First, multicast data received by the multicast communication is stored in the receiving buffer unit 213.

For example, as illustrated in FIG. 4, in the reception-side communication device, the wireless signal reception processing unit 211 controls reception of the pieces of multicast data MA-1 to MA-4 related to the multicast communication MA, and the buffer management unit 203 stores the pieces of multicast data MA-1 to MA-4 to be received from reception data extracted by the reception data frame extraction unit 212 in the receiving buffer unit 213. After the multicast communication ends, in the reception-side communication device, the wireless signal reception processing unit 211 controls reception of a flush frame transmitted from the transmission-side communication device.

As illustrated in FIG. 4, it is assumed that the flush frame: Flash A is received in the reception-side communication device. The multicast reception sequence management unit 215 may acquire the flush frame and specify the pieces of multicast data MA-1 to MA-4 to which sequence numbers SN:1, SN:4, SN:5, and SN:7 indicated by the flush frame are attached as multicast data to be processed.

According to the configuration of the reception-side communication device, even when a sequence number space is shared among the plurality of piece of multicast data transmitted from the transmission-side communication device, predetermined processing on desired data can be performed in the reception-side communication device. Further, in the reception-side communication device, predetermined processing may be performed on the specified pieces of multicast data MA-1 to MA-4 to be processed.

The predetermined processing is not limited. For example, in the reception-side communication device, the multicast reception sequence management unit 215 may determine whether the pieces of multicast data MA-1 to MA-4 to be processed are received with reference to the flush frame. Then, when it is determined that the pieces of multicast data MA-1 to MA-4 to be processed are received, the buffer management unit 203 may deliver the pieces of multicast data MA-1 to MA-4 to be processed from the receiving buffer unit 213 to an upper layer application (the interface unit 201).

Further, for example, when it is determined that the pieces of multicast data MA-1 to MA-4 to be processed are received, the buffer management unit 203 may flush the pieces of multicast data MA-1 to MA-4 to be processed from the receiving buffer unit 213.

Further, the multicast reception sequence management unit 215 may determine whether reception of the pieces of multicast data MA-1 to MA-4 to be processed is completed within a predetermined period with reference to the flush frame. Further, when it is determined that the reception of the pieces of multicast data MA-1 to MA-4 to be processed is not completed even after the lapse of the predetermined period, the buffer management unit 203 may flush received data to be processed among the pieces of multicast data MA-1 to MA-4 to be processed from the receiving buffer unit 213.

Figure 5:
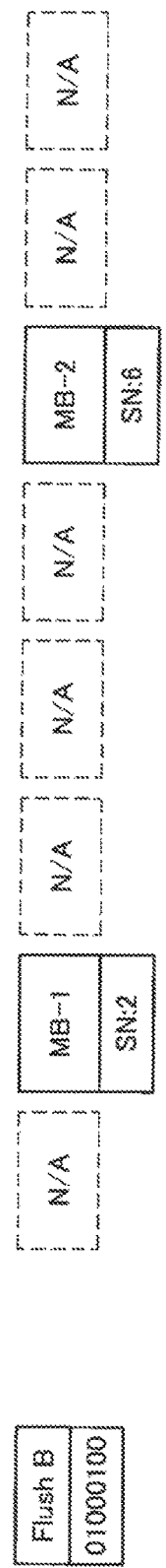
FIG. 5 is a view for describing a sequence of a receiving operation according to the first embodiment of the present disclosure.

FIG. 5 is a view for describing a sequence of a receiving operation according to the first embodiment of the present disclosure. FIG. 5 illustrates a receiving operation of the reception-side communication device performing the multicast communication MB and illustrates an operation of extracting only multicast data to be processed from multicast data transmitted, with inconsecutive sequence numbers attached thereto, from the transmission-side communication device and reconstructing the data. First, multicast data received by the multicast communication is stored in the receiving buffer unit 213.

For example, as illustrated in FIG. 5, in the reception-side communication device, the wireless signal reception processing unit 211 controls reception of the pieces of multicast data MB-1 and MB-2 related to the multicast communication MB, and the buffer management unit 203 stores the pieces of multicast data MB-1 and MB-2 to be received from reception data extracted by the reception data frame extraction unit 212 in the receiving buffer unit 213. After the multicast communication ends, in the reception-side communication device, the wireless signal reception processing unit 211 controls reception of the flush frame transmitted from the transmission-side communication device.

As illustrated in FIG. 5, it is assumed that the flush frame: Flash B is received in the reception-side communication device. The multicast reception sequence management unit 215 may acquire the flush frame and specify the pieces of multicast data MB-1 and MB-2 to which sequence numbers SN:2 and SN:6 indicated by the flush frame are attached as multicast data to be processed.

According to the configuration of the reception-side communication device, even when a sequence number space is shared among the plurality of multicast data transmitted from the transmission-side communication device, predetermined processing on desired data can be performed in the reception-side communication device. Further, in the reception-side communication device, predetermined processing may be performed on the specified pieces of multicast data MB-1 and MB-2 to be processed.

The predetermined processing is not limited. For example, in the reception-side communication device, the multicast reception sequence management unit 215 may determine whether the pieces of multicast data MB-1 and MB-2 to be processed are received with reference to the flush frame. Then, when it is determined that the pieces of multicast data MB-1 and MB-2 to be processed are received, the buffer management unit 203 may deliver the pieces of multicast data MB-1 and MB-2 to be processed from the receiving buffer unit 213 to an upper layer application (the interface unit 201).

Further, for example, when it is determined that the pieces of multicast data MB-1 and MB-2 to be processed are received, the buffer management unit 203 may flush the pieces of multicast data MB-1 and MB-2 to be processed from the receiving buffer unit 213.

Further, the multicast reception sequence management unit 215 may determine whether reception of the pieces of multicast data MB-1 and MB-2 to be processed is completed within a predetermined period with reference to the flush frame. Further, when it is determined that the reception of the pieces of multicast data MB-1 and MB-2 to be processed is not completed even after the lapse of the predetermined period, the buffer management unit 203 may flush received data to be processed of the pieces of multicast data MB-1 and MB-2 to be processed from the receiving buffer unit 213.

Figure 6:
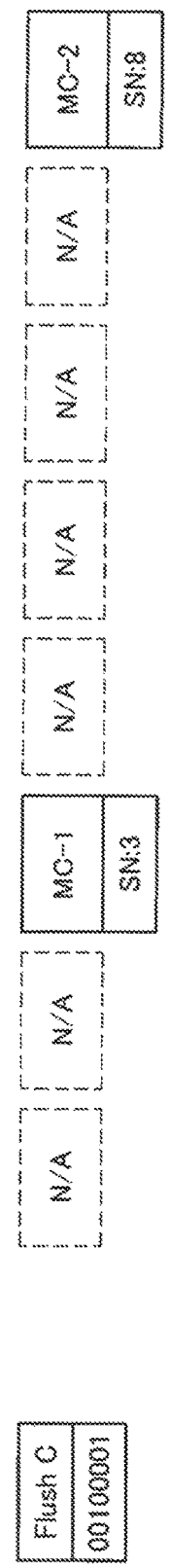
FIG. 6 is a view for describing a sequence of a receiving operation according to the first embodiment of the present disclosure.

FIG. 6 is a view for describing a sequence of a receiving operation according to the first embodiment of the present disclosure. FIG. 6 illustrates a receiving operation of the reception-side communication device performing the multicast communication MC and illustrates an operation of extracting only multicast data to be processed from multicast data transmitted, with inconsecutive sequence numbers attached thereto, from the transmission-side communication device and reconstructing the data. First, multicast data received by the multicast communication is stored in the receiving buffer unit 213.

For example, as illustrated in FIG. 6, in the reception-side communication device, the wireless signal reception processing unit 211 controls reception of the pieces of multicast data MC-1 and MC-2 related to the multicast communication MC, and the buffer management unit 203 stores the pieces of multicast data MC-1 and MC-2 to be received from reception data extracted by the reception data frame extraction unit 212 in the receiving buffer unit 213. After the multicast communication ends, in the reception-side communication device, the wireless signal reception processing unit 211 controls reception of the flush frame transmitted from the transmission-side communication device.

As illustrated in FIG. 6, it is assumed that the flush frame: Flash C is received in the reception-side communication device. The multicast reception sequence management unit 215 may acquire the flush frame and specify the pieces of multicast data MC-1 and MC-2 to which sequence numbers SN:3 and SN:8 indicated by the flush frame are attached as multicast data to be processed.

According to the configuration of the reception-side communication device, even when a sequence number space is shared among the plurality of pieces of multicast data transmitted from the transmission-side communication device, predetermined processing on desired data can be performed in the reception-side communication device. Further, in the reception-side communication device, predetermined processing may be performed on the specified pieces of multicast data MC-1 and MC-2 to be processed.

The predetermined processing is not limited. For example, in the reception-side communication device, the multicast reception sequence management unit 215 may determine whether the pieces of multicast data MC-1 and MC-2 to be processed are received with reference to the flush frame. Then, when it is determined that the pieces of multicast data MC-1 and MC-2 to be processed are received, the buffer management unit 203 may deliver the pieces of multicast data MC-1 and MC-2 to be processed from the receiving buffer unit 213 to an upper layer application (the interface unit 201).

Further, for example, when it is determined that the pieces of multicast data MC-1 and MB-C to be processed are received, the buffer management unit 203 may flush the pieces of multicast data MC-1 and MC-2 to be processed from the receiving buffer unit 213.

Further, the multicast reception sequence management unit 215 may determine whether reception of the pieces of multicast data MC-1 and MC-2 to be processed is completed within a predetermined period with reference to the flush frame. Further, when it is determined that the reception of the pieces of multicast data MC-1 and MC-2 to be processed is not completed even after the lapse of the predetermined period, the buffer management unit 203 may flush received data to be processed of the pieces of multicast data MC-1 and MC-2 to be processed from the receiving buffer unit 213.

Although the case in which a flush frame of a single flow is received is illustrated in FIGS. 4 to 6, it is also assumed that a flush frame for each flow is received. In such a case, the multicast reception sequence management unit 215 may determine whether one or a plurality of pieces of data to be processed related to all flows are received with reference to a flush frame for each of the flows. Also, when it is determined that the one or plurality of pieces of data to be processed related to all of the flows are received, the buffer management unit 203 may flush the one or plurality of pieces of data to be processed related to all of the flows from the receiving buffer unit 213.

The multicast reception sequence management unit 215 may determine whether one or a plurality of pieces of data to be processed related to some of the flows are received with reference to the flush frame for each of the flows. When it is determined that the one or plurality of pieces of data to be processed related to some of the flows are received, the buffer management unit 203 may flush the one or plurality of pieces of data to be processed related to some of the flows from the receiving buffer unit 213 and may not flush the one or plurality of pieces of data to be processed related to remaining flows from the receiving buffer unit 213.

Figure 7:
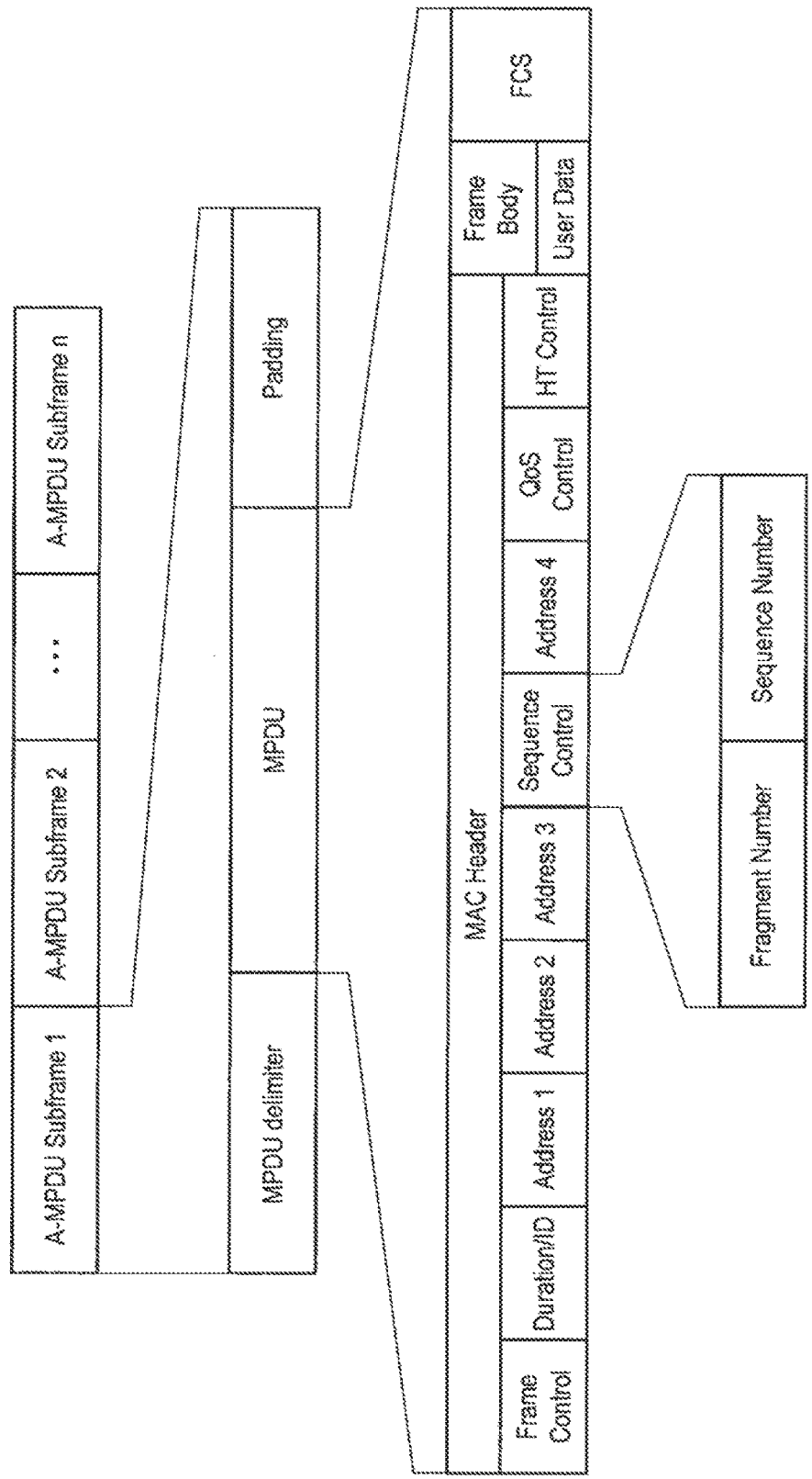
FIG. 7 is a view illustrating a format configuration example of a general aggregate data frame.

FIG. 7 is a view illustrating a format configuration example of a general aggregate data frame. In the example illustrated in FIG. 7, as a single PHY burst, a MAC Protocol Data Unit (MPDU), which is a plurality of pieces of user data, is configured as an aggregated MPDU (A-MPDU) sub-frame. The A-MPDU sub-frame has an MPDU delimiter, an MPDU, and padding.

Each MPDU has a MAC header, a frame body, and a frame check sequence (FCS), and a fragment number and a sequence number are stored in a sequence control part of the MAC header. That is, a single sequence number is added to a single piece of user data included in a single MPDU, and the piece of user data is transferred.

Figure 8:
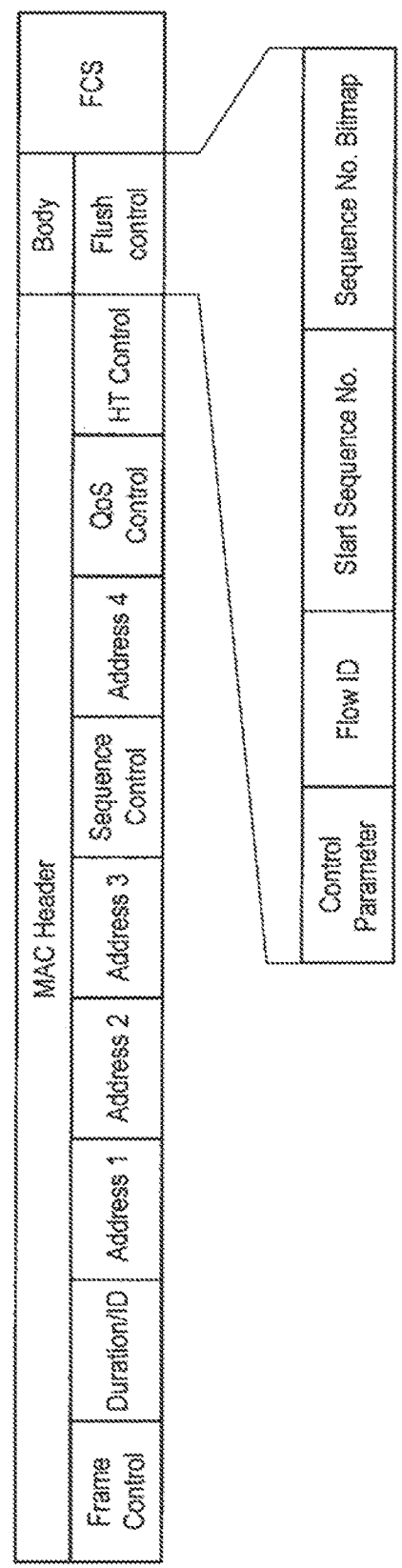
FIG. 8 is a view illustrating a format configuration example of a flush frame according to the first embodiment of the present disclosure.

FIG. 8 is a view illustrating a format configuration example of the flush frame according to the first embodiment of the present disclosure. The flush frame is transmitted as a management frame handled as a single MPDU, a flush control field is configured as a payload body in the MAC header, and an FCS is added thereto. The flush control field includes a control parameter including various pieces of control information, a flow ID for identifying a flow, a start sequence number indicating the start of a sequence number to be flushed, a sequence number bitmap indicating a predetermined number starting from the start sequence number, and the like.

The first embodiment of the present disclosure has been described above. According to the first embodiment of the present disclosure, even when unreachable multicast data is present, a sequence number thereof may be specified. Here, the reception-side communication device may return block acknowledgement to the transmission-side communication device as necessary and receive re-transmitted data.

Further, an example in which a flush frame is transmitted with an end of transmission of a series of data stored in the transmitting buffer unit 202 as a trigger has been described above. However, the trigger for the transmission of the flush frame is not particularly limited. For example, the trigger for the transmission of the flush frame may be a predetermined data transmission being performed or a lapse of a predetermined time after first multicast data is transmitted.

Further, an operation of a communication device that functions as a transmission-side communication device and an operation of a communication device that functions as a reception-side communication device among the communication devices 10-1 to 10-4 have been separately described above. However, each of the communication devices 10-1 to 10-4 may have the functions of both the transmission-side communication device and the reception-side communication device or may have a function of only one of the transmission-side communication device and the reception-side communication device.

4. Second Embodiment

Figure 9:
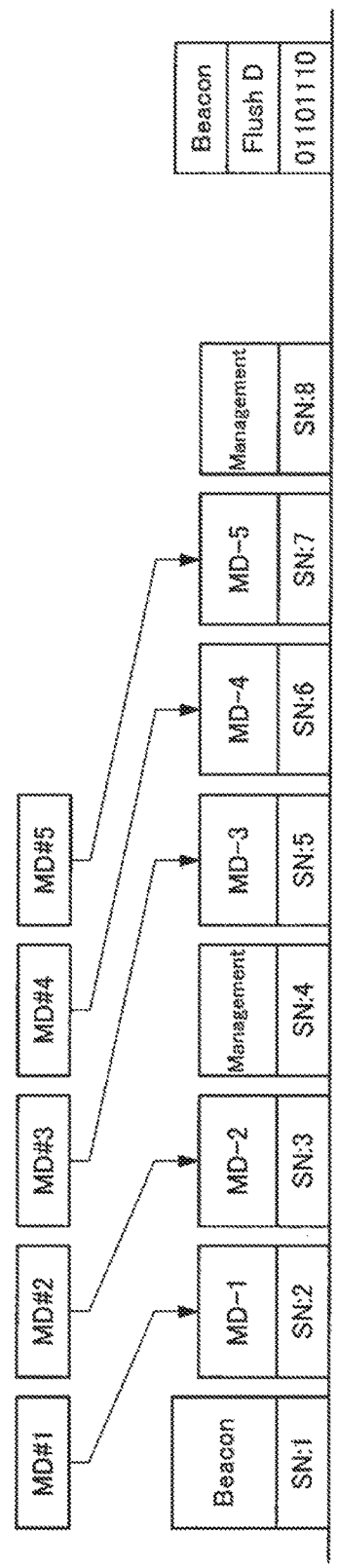
FIG. 9 is a view for describing a sequence of a transmitting operation according to a second embodiment of the present disclosure.

Next, the second embodiment of the present disclosure will be described. FIG. 9 is a view for describing a sequence of a transmitting operation according to the second embodiment of the present disclosure. In the second embodiment of the present disclosure, when a transmission-side communication device is operating as an access point that transmits a predetermined beacon signal, number information (hereinafter, also referred to as "flush information") is added to the beacon signal, and a reception-side communication device is notified of the flush information at a predetermined cycle by the beacon signal. Referring to FIG. 9, multicast communication MD is performed from the transmission-side communication device, and a flow of the multicast communication MD is present.

Here, although an access point of a wireless network transmits a beacon signal at a predetermined cycle, the beacon signal may be present as a management frame. Therefore, the multicast transmission sequence management unit 206 adds a predetermined sequence number to a beacon signal, and the wireless signal transmission processing unit 205 controls transmission of the beacon signal to which the sequence number is added. Here, a sequence number SN:1 is added to a beacon signal and the beacon signal is transmitted, a sequence number SN:2 is added to multicast data MD-1 and the multicast data MD-1 is transmitted, and a sequence number SN:3 is added to multicast data MD-2 and the multicast data MD-2 is transmitted.

A sequence number SN:4 is added to another management frame and the other management frame is transmitted, a sequence number SN:5 is added to multicast data MD-3 and the multicast data MD-3 is transmitted, a sequence number SN:6 is added to multicast data MD-4 and the multicast data MD-4 is transmitted, and a sequence number SN:7 is added to multicast data MD-5 and the multicast data MD-5 is transmitted. Also, a sequence number SN:8 is added to another management frame and the other management frame is transmitted. Then, flush information: Flash D of the present disclosure is added to the next beacon signal and the beacon signal is transmitted.

Figure 10:
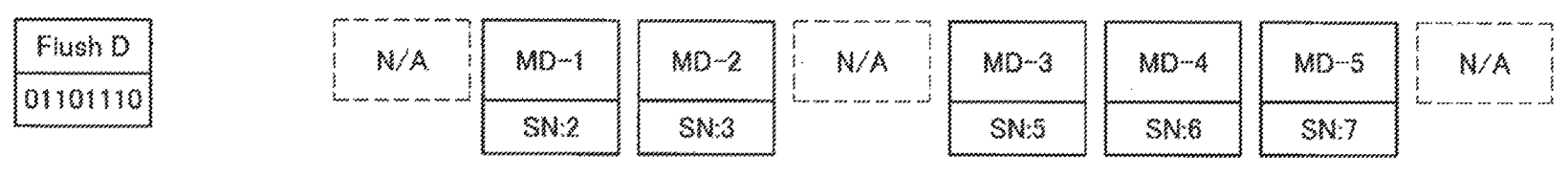

FIG. 10 is a view for describing a sequence of a receiving operation according to the second embodiment of the present disclosure. FIG. 10 illustrates a receiving operation of the reception-side communication device performing the multicast communication MD and illustrates an operation of reconstructing data by extracting only multicast data to be processed from data received by the reception data frame extraction unit 212 from multicast data sent from the transmission-side communication device as inconsecutive sequence numbers and reconstructing the data. First, the multicast data to be received, received by the multicast communication, is stored in the receiving buffer unit 213.

As illustrated in FIG. 10, it is assumed that a beacon signal in which the flush information: Flash D is set is received in the reception-side communication device. The multicast reception sequence management unit 215 may extract the flush information: Flash D from the beacon signal and specify the pieces of multicast data MA-1 to MA-5 to which the sequence numbers SN:2, SN3, SN5, SN6 and SN7 indicated by the flush information are attached as multicast data to be processed.

As in the first embodiment of the present disclosure, according to the configuration of the reception-side communication device, even when a sequence number space is shared among the plurality of pieces of multicast data transmitted from the transmission-side communication device, predetermined processing can be performed on desired data in the reception-side communication device. Further, in the reception-side communication device, predetermined processing may be performed on the specified multicast data MA-1 to MA-5 to be processed. As in the first embodiment of the present disclosure, the predetermined processing is not limited.

Figure 11:
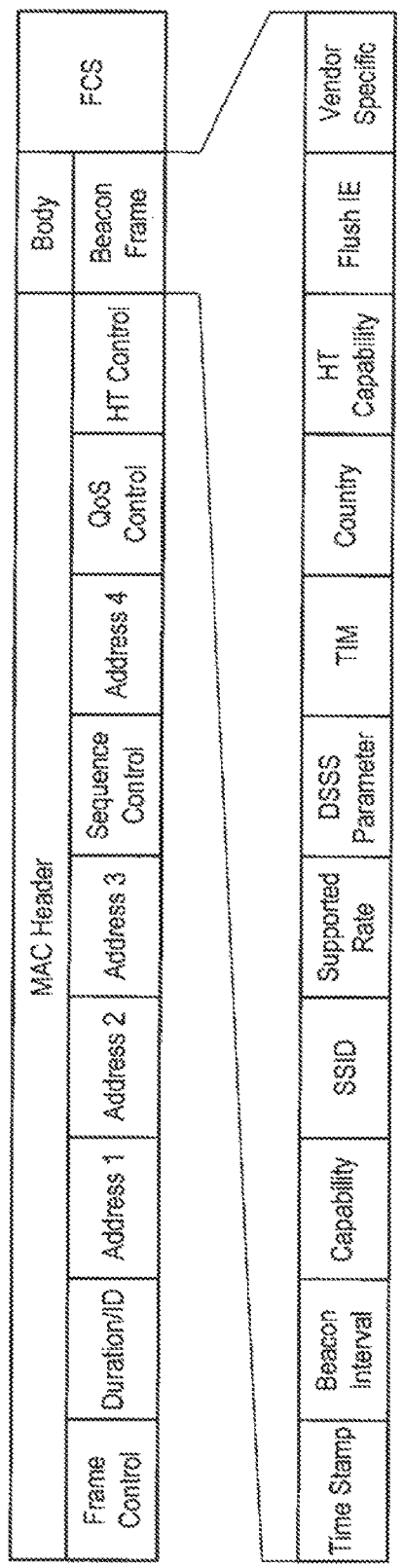
FIG. 11 is a view illustrating a format configuration example of a beacon signal according to a second embodiment of the present disclosure.

FIG. 11 illustrates a format configuration example of a beacon signal according to the second embodiment of the present disclosure. As illustrated in FIG. 11, a beacon signal is transmitted as a management frame handled as a single MPDU and is configured as an FCS in a payload of the beacon signal in a MAC header. The beacon payload includes information for setting various parameters, and flush information according to the second embodiment may also be included therein.

FIG. 12 is a view illustrating a configuration example of the flush information according to the second embodiment of the present disclosure. The flush information includes an element type for designating an element type, a length indicating a length of the flush information, a control parameter including various pieces of control information, a flow ID for identifying a flow, a start sequence number indicating a start of a sequence number to be flushed, and a sequence number bit map indicating a predetermined number starting from the start sequence number.

Figure 13:
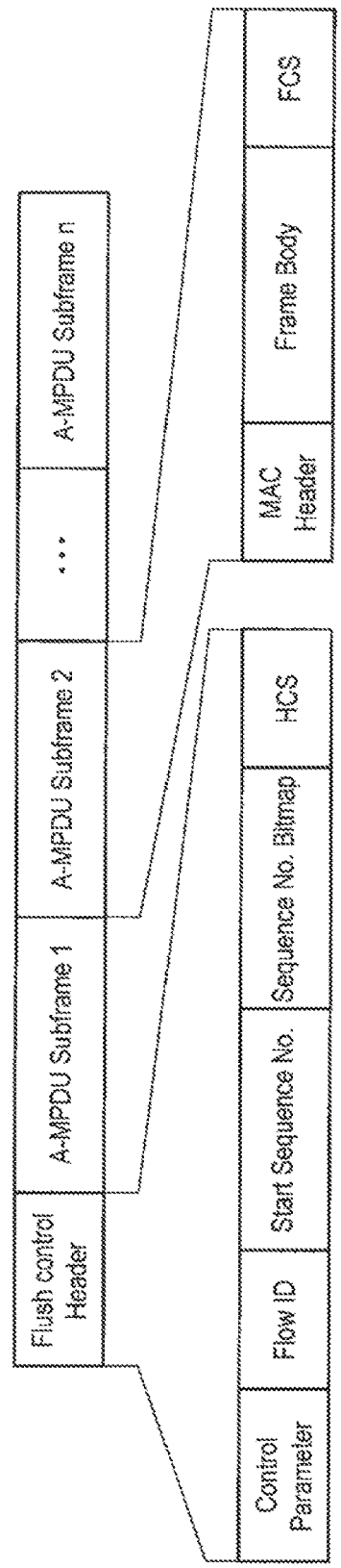
FIG. 13 is a view illustrating a header configuration example to which the flush information of the present disclosure is added.

FIG. 13 is a view illustrating a header configuration example to which the flush information of the present disclosure is added. In the example illustrated in FIG. 13, a flush control header is added in front of or the end of an A-MPDU sub-frame in which an MPDU, which is a plurality of pieces of user data, is aggregated as a single PHY burst.

The flush control header includes a control parameter including various pieces of control information, a flow ID for identifying a flow, a start sequence number indicating a start of a sequence number to be flushed, and flush information (for example, a sequence number bitmap indicating a predetermined number starting from the start sequence number). Further, a header check sequence for determining whether an error occurs in the header portion may be added to the flush control header.

Figure 14:
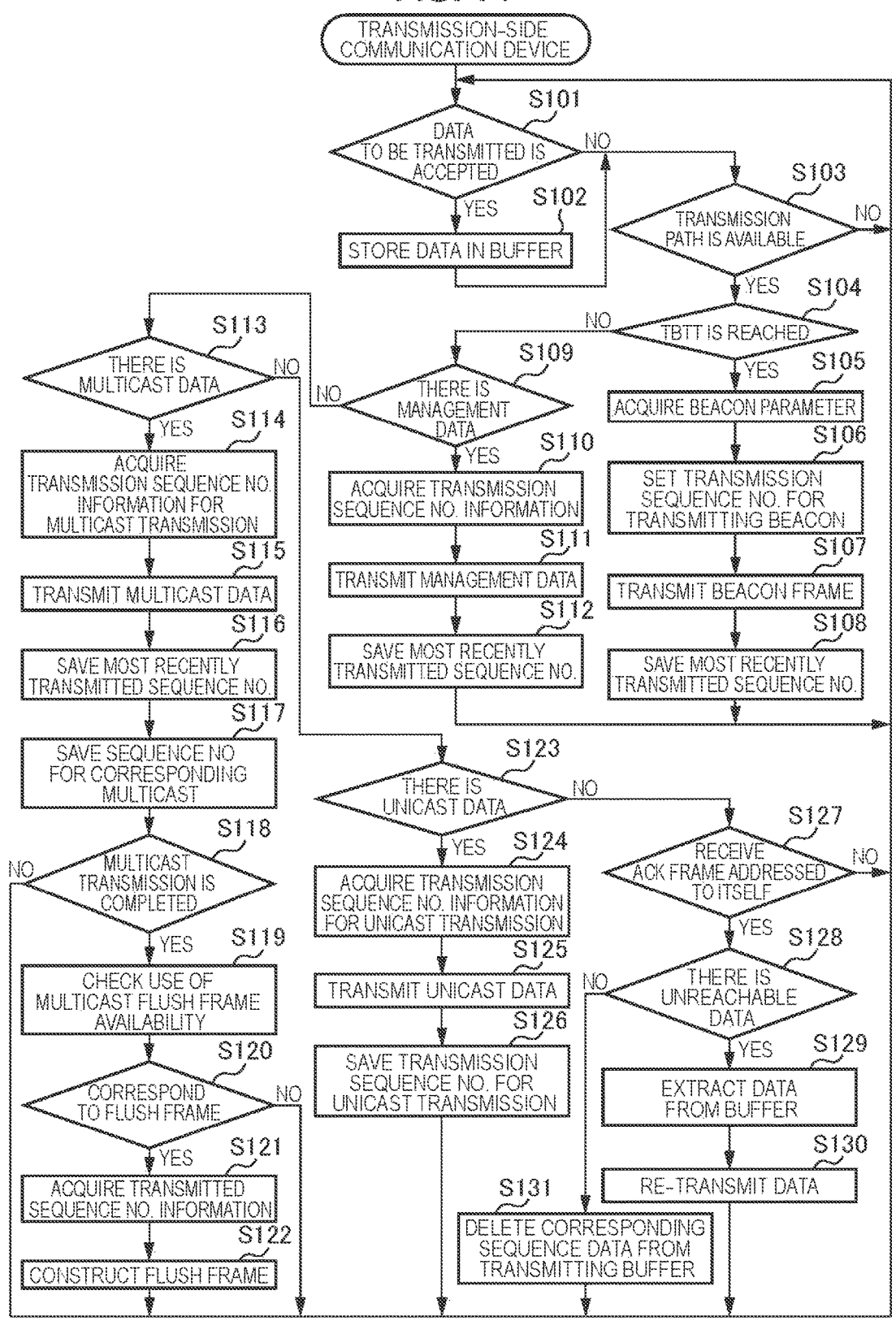
FIG. 14 is a view illustrating a flowchart of an operation related to a transmission-side communication device.

FIG. 14 is a view illustrating a flowchart of an operation related to a transmission-side communication device. The transmission-side communication device determines whether data to be transmitted is accepted from an application device connected thereto via an interface (S101), and when the data to be transmitted is accepted, stores the data in a transmitting buffer (S102). Further, the transmission-side communication device grasps a use status of a wireless transmission path (S103), and, when the transmission path is available at a target beacon transmission time: TBTT (S104), acquires a beacon parameter (S105).

Then, the transmission-side communication device sets a transmission sequence number of a beacon signal which is a management frame (S106), transmits the beacon signal for which the transmission sequence number is set (S107), and saves the latest sequence number added to the transmitted beacon signal (S108).

If management data is present in the transmitting buffer (S109), the transmission-side communication device acquires transmission sequence number information (S110), transmits management data, in which a value obtained by incrementing the latest sequence number is set, as a frame (Sill), and saves the latest sequence number added to the transmitted management frame (S112). Here, when multicasting or broadcasting the management data, the frame is transmitted using a sequence number for multicasting.

Then, when transmission data of multicast communication is stored in the transmitting buffer (S113), the transmission-side communication device acquires sequence number information for multicasting (S114), transmits multicast data, for which a value obtained by incrementing the sequence number is set, as a frame (S115), and saves the latest sequence number added to the transmitted management frame (S116).

Further, the transmission-side communication device saves the sequence number in association with a transmission sequence number corresponding to a flow for the multicast communication (S117). That is, when a flow of a plurality of multicast communications is shared, a value of a sequence number transmitted for each of the flows of the multicast is saved.

Then, when transmission of a series of multicast communications is completed for each of the multicast flows (S118), the transmission-side communication device checks the use of the flush frame of the present disclosure (S119), and when corresponding to the flush frame (S120), the transmission-side communication device acquires information of the transmitted sequence number corresponding to the flow of the multicast communication (S121) and constructs a flush frame as a frame of management data (S122). Although an example of constructing a flush frame is shown here, when a beacon signal in which flush information is set is transmitted, a beacon signal in which flush information is set may be constructed.

If data to be unicast-transmitted is present in the transmitting buffer (S123), the transmission-side communication device acquires a transmission sequence number corresponding to a destination reception-side communication device (S124), transmits unicast data, in which a value obtained by incrementing the sequence number is set, as a frame (S125), and saves the latest sequence number corresponding to the reception-side communication device (S126).

Further, when the transmission-side communication device receives an ACK frame addressed to itself (S127), if it is determined that unreachable data is present therein from information of the ACK frame (S128), the transmission-side communication device extracts the unreachable data from the transmitting buffer (S129) and re-transmits the data (S130). On the other hand, if it is determined that unreachable data is not present (if receipt of all data is confirmed), the transmission-side communication device deletes data related to the sequence of the multicast communication from the transmitting buffer (S131).

Figure 15:
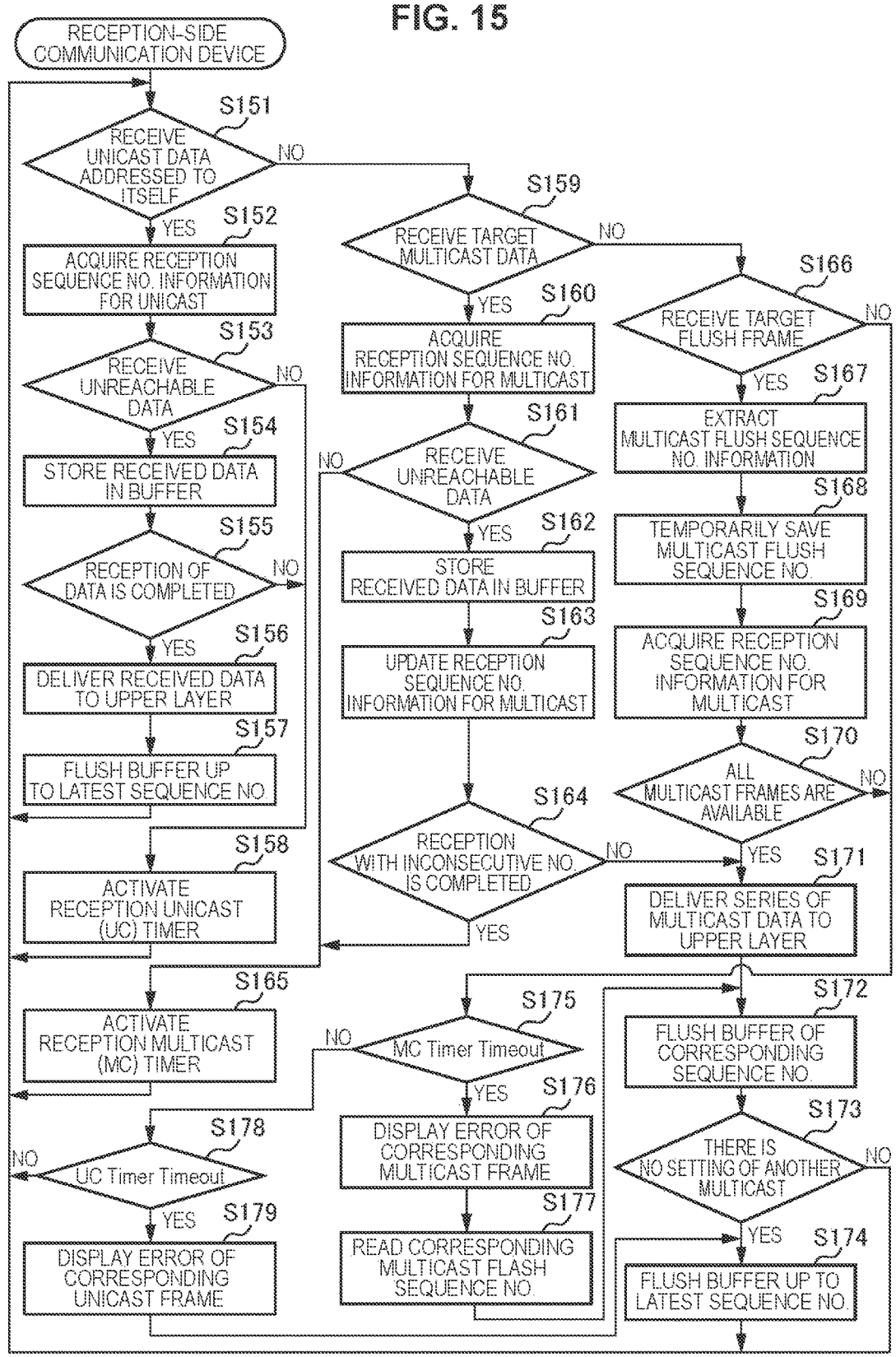
FIG. 15 is a view illustrating a flowchart of an operation related to a reception-side communication device.

FIG. 15 is a view illustrating a flowchart of an operation related to the reception-side communication device. When the reception-side communication device receives (unicast) data addressed to itself (S151), the reception-side communication device acquires reception sequence number information for unicast (S152), and if it is determined that unreachable data is received from the value for the unicast sequence number included in the received data (S153), the reception-side communication device stores the received data in the receiving buffer (S154).

For example, there is a case in which the reception-side communication device determines that additional received data is not sent from information such as More Data Bit in header information of a data frame. In such a case, the reception-side communication device determines that reception of a series of data is completed (S155), delivers the data to an upper layer (S156), and flushes data from the start sequence number to the latest sequence number from the receiving buffer (S157). On the other hand, when the reception of the series of data is not completed, the reception-side communication device activates a reception unicast timer (S158).

When multicast data addressed to itself is received in the reception-side communication device (S159), the reception-side communication device acquires reception sequence number information for multicast (S160). Next, when it is determined that unreachable data is received from a value of a multicast sequence number included in the received data (S161), the reception-side communication device stores the received data in the receiving buffer (S162), and updates information of the reception sequence number for multicast (S163). Here, when the reception is completed with inconsecutive sequence numbers (S164), the reception-side communication device activates a reception multicast timer (S165).

On the other hand, when all data of the multicast communication is received with consecutive sequence numbers, the reception-side communication device, for example, determines that a series of the received data is completed from information such as More Data Bit in the header information of the data frame in some cases. In such a case, the reception-side communication device shifts the operation to S171.

When a flush frame of multicast communication addressed to itself is received in the reception-side communication device (S166), the reception-side communication device extracts a list of maps of sequence numbers that can be flushed in the multicast communication from information of flush sequence numbers of the multicast communication (S167). Then, the reception-side communication device temporarily saves the sequence numbers (S168) and acquires a list of received numbers of the multicast communication received by itself (S169).

Here, if reception of all of the series of sequence numbers of the multicast communication is completed (S170), the reception-side communication device may perform a process of delivering the series of multicast data to an upper layer (S171). When the multicast data is delivered to the upper layer, for example, control may be performed such that image information is output to a display connected thereto via an interface. Further, the reception-side communication device flushes the received data from the receiving buffer of the sequence numbers (S172).

If reception setting of another multicast communication is not performed (S173), the reception-side communication device flushes received data from the start sequence number up to the latest sequence number (S174). Alternatively, if a flushable sequence number of a frame to be used other than the multicast communication is added to the flush frame, the reception-side communication device may flush the frame from the receiving buffer.

On the other hand, it is assumed that data of a series of sequence numbers of the multicast communication is not available. In such a case, when the reception multicast timer times out (S175), the reception-side communication device displays a reception error of the multicast frame (S176) and reads a series of sequence numbers of the multicast communication which is temporarily saved (S177). Then, the reception-side communication device shifts the operation to S172 and flushes received data corresponding to the sequence numbers from the receiving buffer.

When the reception unicast timer times out (S178), the reception-side communication device displays a reception error of the unicast frame (S179). Then, the reception-side communication device shifts the operation to S174 and flushes the received data from the start sequence number up to the latest sequence number from the receiving buffer.

5. Application Examples

The technology according to the present disclosure is applicable to various products. In one example, the communication device 10 may be implemented as a mobile terminal such as smartphones, tablet personal computers (PCs), notebook PCs, portable game terminals, or digital cameras, a fixed-type terminal such as television receivers, printers, digital scanners, or network storages, or a car-mounted terminal such as car navigation devices. In addition, the communication device 10 may be implemented as a terminal (also referred to as machine type communication (MTC) terminal) which performs machine-to-machine (M2M) communication, such as smart meters, vending machines, remote monitoring devices, and point of sale (POS) terminals. Furthermore, the communication device 10 may be a wireless communication module mounted in such terminals (e.g., integrated circuit modules configured in one die).

On the other hand, in one example, the communication control device may be implemented as a wireless LAN access point (also referred to as a wireless base station) having or not having a router function. In addition, the communication control device may be implemented as a mobile wireless LAN router. Furthermore, the communication control device may be a wireless communication module mounted on such devices (e.g., integrated circuit modules configured in one die).

5-1. First Application Example

Figure 16:
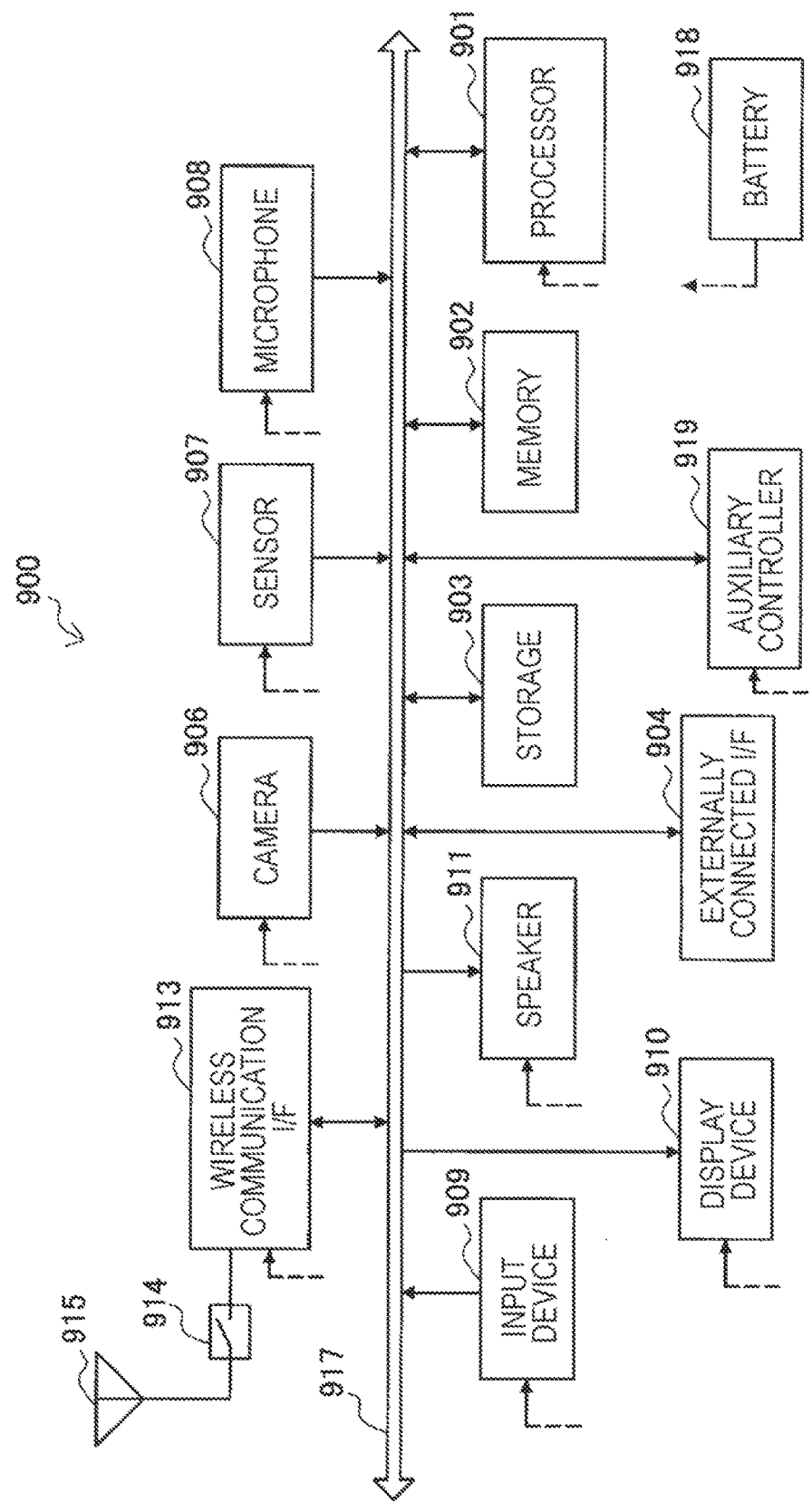
FIG. 16 is a block diagram illustrating an example of a schematic configuration of a smartphone.

FIG. 16 is a block diagram illustrating an example of a schematic configuration of a smartphone 900 to which the technology of the present disclosure can be applied. The smartphone 900 is configured to include a processor 901, a memory 902, a storage 903, an externally connected interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, in one example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semi-conductor memory or a hard disk. The externally connected interface 904 is an interface for connecting an externally attached device such as a memory card or a universal serial bus (USB) device to the smartphone 900.

The camera 906 has, in one example, an image sensor such as a charge coupled device (CCD) or a complementary metal oxide semiconductor (CMOS), and generates a captured image. The sensor 907 can include a sensor group including, in one example, a positioning sensor, a gyro sensor, a geomagnetic sensor, an acceleration sensor, and the like. The microphone 908 converts voice input to the smartphone 900 into an audio signal. The input device 909 includes, in one example, a touch sensor that detects touches on a screen of the display device 910, a key pad, a keyboard, buttons, switches, and the like, and accepts an operation or information input from a user. The display device 910 has a screen such as a liquid crystal display (LCD) or an organic light emitting diode (OLED) display, and displays an output image of the smartphone 900. The speaker 911 converts an audio signal output from the smartphone 900 into voice.

The wireless communication interface 913 supports one or more wireless LAN standards such as IEEE 802.11a, 11b, 11g, 11n, 11ac, and 11ad, and executes wireless LAN communication. The wireless communication interface 913 can communicate with other devices via a wireless LAN access point in the infrastructure mode. In addition, the wireless communication interface 913 can directly communicate with other devices in a direct communication mode such as an ad hoc mode, and Wi-Fi Direct (registered trademark). In Wi-Fi Direct mode, unlike ad hoc mode, one of two terminals operates as an access point, but communication is performed directly between the terminals. The wireless communication interface 913 can typically include a baseband processor, a radio frequency (RF) circuit, a power amplifier, and the like. The wireless communication interface 913 may be a single-chip module on which a memory for storing a communication control program, a processor for executing the program, and a relevant circuit are integrated. The wireless communication interface 913 may support other types of wireless communication schemes such as a short-range wireless communication scheme, a close proximity wireless communication scheme, or a cellular communication scheme, in addition to the wireless LAN scheme. The antenna switch 914 switches a connection destination of the antenna 915 among a plurality of circuits (e.g., circuits for different wireless communication schemes) included in the wireless communication interface 913. The antenna 915 has a single antenna element or a plurality of antenna elements (e.g., a plurality of antenna elements constituting a MIMO antenna), and is used for transmission and reception of a wireless signal through the wireless communication interface 913.

Moreover, the configuration of the smartphone 900 is not limited to the example of FIG. 16, and may include a plurality of antennas (e.g., an antenna for a wireless LAN and an antenna for a proximity wireless communication scheme). In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 illustrated in FIG. 16 via a power supply line partially indicated by dashed lines in the figure. The auxiliary controller 919 operates the required minimum functions of the smartphone 900, in one example, in the sleep mode.

In the smartphone 900 illustrated in FIG. 16, the wireless signal transmission processing unit 205, the access control unit 208, and the wireless signal reception processing unit 211 described with reference to FIG. 2 may be implemented in a wireless communication interface 913. Also, at least some of the wireless signal transmission processing unit 205, the access control unit 208, and the wireless signal reception processing unit 211 may be implemented in a processor 901 or an auxiliary controller 919. For example, the wireless signal transmission processing unit 205 converts a baseband signal into a high-frequency signal. The access control unit 208 controls access of communication on the wireless transmission path according to a predetermined wireless communication protocol. Further, the wireless signal reception processing unit 211 extracts the baseband signal from the high-frequency signal.

Moreover, the smartphone 900 may operate as a wireless access point (software AP) by the processor 901 executing an access point function at the application level. In addition, the wireless communication interface 913 may have the wireless access point function.

5-2. Second Application Example

Figure 17:
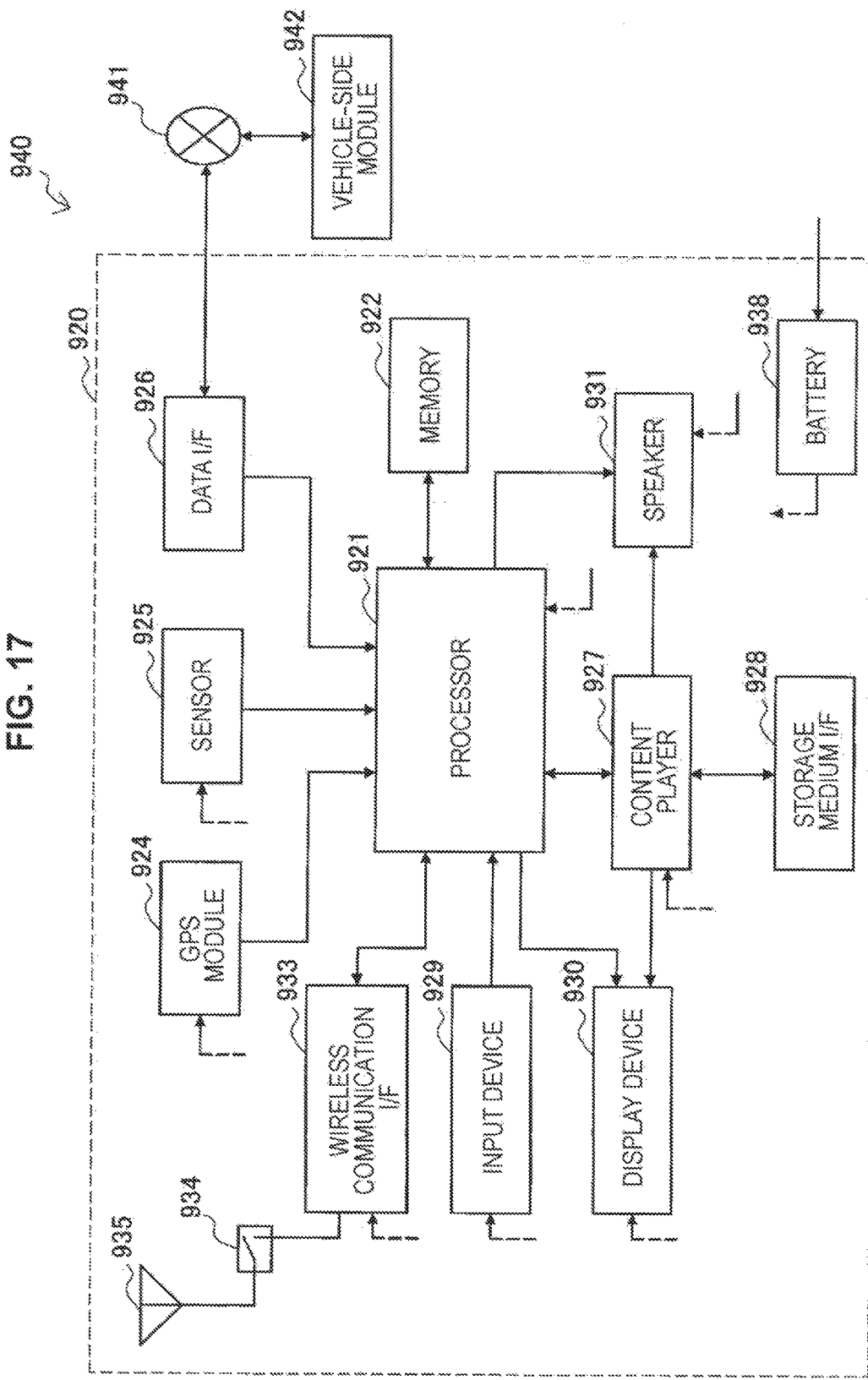
FIG. 17 is a block diagram illustrating an example of a schematic configuration of a car navigation device.

FIG. 17 is a block diagram illustrating an example of a schematic configuration of a car navigation device 920 to which the technology according to the present disclosure can be applied. The car navigation device 920 is configured to include a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, in one example, a CPU or SoC, and controls a navigation function and other functions of the car navigation device 920. The memory 922 includes a RAM and a ROM, and stores programs executed by the processor 921 and data.

The GPS module 924 measures the position (e.g., latitude, longitude, and altitude) of the car navigation device 920 using GPS signals received from a GPS satellite. The sensor 925 can include a sensor group including, in one example, a gyro sensor, a geomagnetic sensor, and a barometric pressure sensor. The data interface 926 is connected to, in one example, an in-vehicle network 941 via a terminal that is not illustrated, and acquires data generated on the vehicle side such as car speed data.

The content player 927 reproduces the content stored in a storage medium (e.g., CD or DVD) inserted into the storage medium interface 928. The input device 929 includes, in one example, a touch sensor that detects touches on a screen of the display device 930, buttons, switches, and the like, and accepts an operation or information input from the user. The display device 930 has a screen such as an LCD or an OLED display, and displays a navigation function or an image of content. The speaker 931 outputs sound of the navigation function or the content to be reproduced.

The wireless communication interface 933 supports one or more wireless LAN standards such as IEEE 802.11a, 11b, 11g, 11n, 11ac, and 11ad, and executes wireless LAN communication. The wireless communication interface 933 can communicate with other devices via a wireless LAN access point in the infrastructure mode. In addition, the wireless communication interface 933 can directly communicate with other devices in a direct communication mode, such as an ad hoc mode and Wi-Fi Direct. The wireless communication interface 933 can typically have a baseband processor, an RF circuit, a power amplifier, and the like. The wireless communication interface 933 may be a single-chip module on which a memory for storing a communication control program, a processor for executing the program, and a relevant circuit are integrated. The wireless communication interface 933 may support other types of wireless communication schemes such as a short-range wireless communication scheme, a close proximity wireless communication scheme, or a cellular communication scheme, in addition to the wireless LAN scheme. The antenna switch 934 switches a connection destination of the antenna 935 among a plurality of circuits included in the wireless communication interface 933. The antenna 935 has a single antenna element or a plurality of antenna elements, and is used for transmission and reception of a wireless signal from the wireless communication interface 933.

Moreover, the configuration of the car navigation device 920 is not limited to the example of FIG. 17, and may include a plurality of antennas. In this case, the antenna switch 934 may be omitted from the configuration of the car navigation device 920.

The battery 938 supplies electric power to each of the blocks of the car navigation device 920 illustrated in FIG. 17 via a power supply line partially indicated by a dashed line in the figure. In addition, the battery 938 accumulates electric power supplied from the vehicle side.

In the car navigation device 920 illustrated in FIG. 17, the wireless signal transmission processing unit 205, the access control unit 208, and the wireless signal reception processing unit 211 described with reference to FIG. 2 may be implemented in a wireless communication interface 933. Also, at least some of the wireless signal transmission processing unit 205, the access control unit 208, and the wireless signal reception processing unit 211 may be implemented in a processor 921. For example, the wireless signal transmission processing unit 205 converts a baseband signal into a high-frequency signal. The access control unit 208 controls access of communication on the wireless transmission path according to a predetermined wireless communication protocol. Further, the wireless signal reception processing unit 211 extracts the baseband signal from the high-frequency signal.

Further, the wireless communication interface 933 may operate as the above-described communication control device and may provide wireless connection to a terminal carried by a user who rides in a vehicle.

Further, the technology according to the present disclosure may be implemented as an in-vehicle system (or vehicle) 940 including one or more blocks of the above-described car navigation device 920, the in-vehicle network 941, and a vehicle-side module 942. The vehicle-side module 942 generates vehicle-side data such as vehicle speed, engine rpm, or failure information, and outputs the generated data to the in-vehicle network 941.

5-3. Third Application Example

Figure 18:
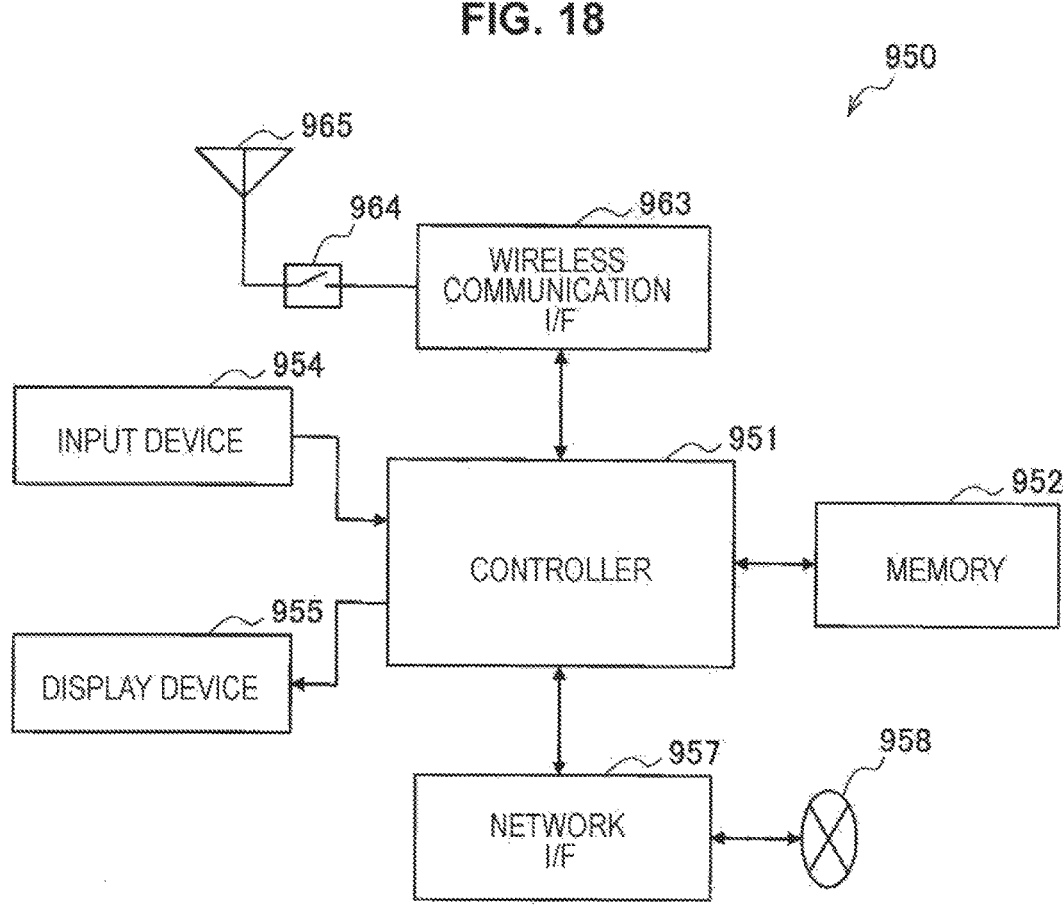
FIG. 18 is a block diagram illustrating an example of a schematic configuration of a wireless access point.

FIG. 18 is a block diagram illustrating an example of a schematic configuration of a wireless access point 950 to which the technology according to the present disclosure can be applied. The wireless access point 950 is configured to include a controller 951, a memory 952, an input device 954, a display device 955, a network interface 957, a wireless communication interface 963, an antenna switch 964, and an antenna 965.

The controller 951 may be, in one example, a CPU or a digital signal processor (DSP), and operates various functions (e.g., access restriction, routing, encryption, firewall, and log management) of the Internet Protocol (IP) layer and higher layers of the wireless access point 950. The memory 952 includes a RAM and a ROM, and stores a program to be executed by the controller 951 and various kinds of control data (e.g., a terminal list, a routing table, an encryption key, security settings, and a log).

The input device 954 includes, in one example, a button or a switch, and accepts an operation from a user. The display device 955 includes an LED lamp or the like, and displays operation status of the wireless access point 950.

The network interface 957 is a wired communication interface that connects the wireless access point 950 to the wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards such as IEEE 802.11a, 11b, 11g, 11n, 11ac, and 11ad, and provides wireless connection to a neighboring terminal by functioning as an access point. The wireless communication interface 963 can typically have a baseband processor, an RF circuit, a power amplifier, and the like. The wireless communication interface 963 may be a single-chip module on which a memory for storing a communication control program, a processor for executing the program, and a relevant circuit are integrated. The antenna switch 964 switches a connection destination of the antenna 965 among a plurality of circuits included in the wireless communication interface 963. The antenna 965 has a single antenna element or a plurality of antenna elements, and is used for transmission and reception of a wireless signal from the wireless communication interface 963.

In the wireless access point 950 illustrated in FIG. 18, the wireless signal transmission processing unit 205, the access control unit 208, and the wireless signal reception processing unit 211 described with reference to FIG. 2 may be implemented in a wireless communication interface 963. Also, at least some of the wireless signal transmission processing unit 205, the access control unit 208, and the wireless signal reception processing unit 211 may be implemented in a controller 951. For example, the wireless signal transmission processing unit 205 converts a baseband signal into a high-frequency signal. The access control unit 208 controls access of communication on the wireless transmission path according to a predetermined wireless communication protocol. Further, the wireless signal reception processing unit 211 extracts the baseband signal from the high-frequency signal.

6. Conclusion

As described above, according to the embodiments of the present disclosure, there is provided a transmission control device that includes a communication control unit that controls transmission of a plurality of pieces of data including respective sequence numbers, and a data generation unit that generates, as information indicating one or a plurality of pieces of data to be processed in a reception device among the plurality of pieces of data, number information indicating the sequence numbers included in the one or plurality of pieces of data to be processed, in which the communication control unit controls transmission of the number information to the reception device.

According to the configuration, even when a sequence number space is shared among the plurality of pieces of multicast data transmitted from the transmission-side communication device, predetermined processing can be performed on desired data in the reception-side communication device.

Further, by using flush information, when a sequence number of a transmission-side communication device is shared for multicast communication, data received by a reception-side communication device may be flushed from a buffer. The transmission-side communication device may transmit a flush frame for each multicast flow and manage a single sequence number space for multicast communication of a plurality of other flows. Also, the reception-side communication device can simplify a management method of a sequence number of desired multicast communication, which is designated as destination itself.

The reception-side communication device can easily separate pieces of data sent using the same sequence number in the data frame and the management frame. Also, even when the reception-side communication device receives flush information which is not required by itself, the reception-side communication device can easily grasp the latest sequence numbers thereof. By defining a flush frame in which flush information is defined, when the reception-side communication device receives a flush frame of a flow designated as a destination itself, the reception-side communication device can flush received data from a buffer without waiting for a predetermined timeout time.

By defining a flush information element for a beacon signal, the reception-side communication device can flush a multicast frame to be collected by itself even when the reception-side communication device receives a multicast frame used in another adjacent network. Further, by storing flush information as header information of a data frame, the flush information can be sent to the reception-side communication device without sending another frame.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although a process using the block ACK has been described above as an example, embodiments of the present disclosure are not limited thereto and can be applied to any delivery confirmation processing.

Further, a program for causing hardware, such as a CPU, ROM and RAM built into a computer, to exhibit functions similar to the functions included in the above described the communication device 10 can be created. Further, a recording medium can also be provided which records these programs and is capable of performing reading to the computer.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A transmission control device including:

a communication control unit that controls transmission of a plurality of pieces of data including respective sequence numbers; and a data generation unit that generates, as information indicating one or a plurality of pieces of data to be processed in a reception device among the plurality of pieces of data, number information indicating the sequence numbers included in the one or plurality of pieces of data to be processed, in which the communication control unit controls transmission of the number information to the reception device.

(2)

The transmission control device according to (1), in which the communication control unit controls transmission of the number information by multicast communication.

(3)

The transmission control device according to (2), in which the number information is defined for each flow of the multicast communication.

(4)

The transmission control device according to any one of (1) to (3), in which the communication control unit controls transmission of a management frame including the number information to the reception device.

(5)

The transmission control device according to any one of (1) to (3), in which the communication control unit controls transmission of a beacon signal including the number information to the reception device.

(6)

The transmission control device according to any one of (1) to (3), in which the communication control unit controls transmission of a data frame for which the number information is set in header information to the reception device.

(7)

A transmission control method including:

controlling transmission of a plurality of pieces of data including respective sequence numbers;

generating, as information indicating one or a plurality of pieces of data to be processed in a reception device among the plurality of pieces of data, number information indicating the sequence numbers included in the one or plurality of pieces of data to be processed; and controlling transmission of the number information to the reception device.

(8)

A reception control device including:

a communication control unit that controls reception, from a transmission device, of number information indicating sequence numbers included in one or a plurality of pieces of data to be processed, as information indicating the one or plurality of pieces of data to be processed among a plurality of pieces of data including respective sequence numbers; and a data acquisition unit that acquires the number information.

(9)

The reception control device according to (8), including:

a storage control unit that flushes the one or plurality of pieces of data to be processed from a storage area in a case in which it is determined that the one or plurality of pieces of data to be processed are received with reference to the number information.

(10)

The reception control device according to (9), in which, in a case in which number information for each flow is received, the storage control unit refers to the number information for each of the flows and, in a case in which it is determined that one or plurality of pieces of data to be processed related to all of the flows are received, flushes the one or plurality of pieces of data to be processed related to all of the flows from the storage area.

(11)

The reception control device according to (9), in which, in a case in which number information for each flow is received, the storage control unit refers to the number information for each of the flows and, in a case in which it is determined that one or plurality of pieces of data to be processed related to some of the flows are received, flushes the one or plurality of pieces of data to be processed related to some of the flows from the storage area and does not flush the one or plurality of pieces of data to be processed related to the rest of the flows.

(12)

The reception control device according to (8), including:

a storage control unit that delivers the one or plurality of pieces of data to be processed from a storage area to an upper layer in a case in which it is determined that the one or plurality of pieces of data to be processed are received with reference to the number information.

(13)

The reception control device according to (8), including:

a storage control unit that flushes received data to be processed from a storage area in a case in which it is determined that reception of the one or plurality of pieces of data to be processed is not completed even after a lapse of a predetermined period with reference to the number information.

(14)

A reception control method including:

controlling reception, from a transmission device, of number information indicating sequence numbers included in one or a plurality of pieces of data to be processed, as information indicating the one or plurality of pieces of data to be processed among a plurality of pieces of data including respective sequence numbers; and acquiring the number information.

REFERENCE SIGNS LIST 1 communication system
10 communication device
201 interface unit
202 transmitting buffer unit
203 Buffer management unit
204 transmission data frame construction unit 204
205 wireless signal transmission processing unit
206 multicast transmission sequence management unit 206
207 flush frame construction unit
208 access control unit
209 antenna control unit 210 antenna element
211 wireless signal reception processing unit
212 reception data frame extraction unit
213 receiving buffer unit
214 flush frame extraction unit
215 multicast reception sequence management unit

The invention claimed is:

1. A transmission control device comprising:
 a communication control unit that controls transmission of a plurality of pieces of data including respective sequence numbers; and
 a data generation unit that generates, as information indicating one or a plurality of pieces of data to be processed in a reception device among the plurality of pieces of data, number information indicating the sequence numbers included in the one or plurality of pieces of data to be processed,
 wherein the communication control unit controls transmission of the number information to the reception device by multicast communication comprising a plurality of flows,
 wherein the number information is defined for each of the flows of the multicast communication, and
 wherein the communication control unit controls transmission of flush frames for each flow of the multicast communication, and each of the flush frames comprises information indicating which of the plurality of pieces of data should be processed.

2. The transmission control device according to claim 1, wherein the communication control unit controls transmission of a management frame including the number information to the reception device.

3. The transmission control device according to claim 1, wherein the communication control unit controls transmission of a beacon signal including the number information to the reception device.

4. The transmission control device according to claim 1, wherein the communication control unit controls transmission of a data frame for which the number information is set in header information to the reception device.

5. The transmission control device according to claim 1, wherein the information in the flush frames comprises a flush control field and a frame check sequence.

6. The transmission control device according to claim 5, wherein the flush control field comprises a start sequence number indicating the start of a sequence number to be flushed.

7. A transmission control method comprising:
 controlling transmission of a plurality of pieces of data including respective sequence numbers;
 generating, as information indicating one or a plurality of pieces of data to be processed in a reception device among the plurality of pieces of data, number information indicating the sequence numbers included in the one or plurality of pieces of data to be processed;
 controlling transmission of the number information to the reception device by multicast communication comprising a plurality of flows; and
 controlling transmission of flush frames for each flow of the multicast communication,
 wherein each of the flush frames comprises information indicating which of the plurality of pieces of data should be processed, and
 wherein the number information is defined for each of the flows of the multicast communication.

8. A reception control device comprising:
 a communication control unit that controls reception, from a transmission device, of number information indicating sequence numbers included in one or a plurality of pieces of data to be processed, as information indicating the one or plurality of pieces of data to be processed among a plurality of pieces of data including respective sequence numbers;
 a data acquisition unit that acquires the number information by multicast communication comprising a plurality of flows; and
 a storage control unit that flushes received data to be processed from a storage area in a case in which it is determined that reception of the one or plurality of pieces of data to be processed is not completed even after a lapse of a predetermined period with reference to the number information,
 wherein the number information is defined for each of the flows of the multicast communication, and
 wherein the multicast communication comprises a flush frame, and the storage control unit flushes the received data based at least in part on information in the flush frame.

9. The reception control device according to claim 8, comprising:
 a storage control unit that flushes the one or plurality of pieces of data to be processed from a storage area in a case in which it is determined that the one or plurality of pieces of data to be processed are received with reference to the number information.

10. The reception control device according to claim 9, wherein, in a case in which number information for each flow is received, the storage control unit refers to the number information for each of the flows and, in a case in which it is determined that one or plurality of pieces of data to be processed related to all of the flows are received, flushes the one or plurality of pieces of data to be processed related to all of the flows from the storage area.

11. The reception control device according to claim 9, wherein, in a case in which number information for each flow is received, the storage control unit refers to the number information for each of the flows and, in a case in which it is determined that one or plurality of pieces of data to be processed related to some of the flows are received, flushes the one or plurality of pieces of data to be processed related to some of the flows from the storage area and does not flush the one or plurality of pieces of data to be processed related to the rest of the flows.

12. The reception control device according to claim 8, comprising:
 a storage control unit that delivers the one or plurality of pieces of data to be processed from a storage area to an upper layer in a case in which it is determined that the one or plurality of pieces of data to be processed are received with reference to the number information.

13. A reception control method comprising:
 controlling reception, from a transmission device, of number information indicating sequence numbers included in one or a plurality of pieces of data to be processed, as information indicating the one or plurality of pieces of data to be processed among a plurality of pieces of data including respective sequence numbers;
 acquiring the number information by multicast communication comprising a plurality of flows; and flushing received data based at least in part on information in a flush frame transmitted in the multicast communication,
wherein the number information is defined for each of the flows of the multicast communication.

\* \* \* \* \*